(12) United States Patent
Taruya et al.

(10) Patent No.: US 11,565,588 B2
(45) Date of Patent: Jan. 31, 2023

(54) FUEL CELL VEHICLE

(71) Applicant: HONDA MOTOR CO., LTD., Tokyo (JP)

(72) Inventors: Kenji Taruya, Wako (JP); Yasushi Shionoya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 398 days.

(21) Appl. No.: 16/822,080

(22) Filed: Mar. 18, 2020

(65) Prior Publication Data

US 2020/0298702 A1 Sep. 24, 2020

(30) Foreign Application Priority Data

Mar. 20, 2019 (JP) .............................. JP2019-053476

(51) Int. Cl.
| | | |
|---|---|---|
| *B60K 28/12* | (2006.01) | |
| *B60L 50/72* | (2019.01) | |
| *B60K 15/05* | (2006.01) | |
| *B60K 23/00* | (2006.01) | |
| *B60L 58/30* | (2019.01) | |
| *H01M 8/04082* | (2016.01) | |
| *B60Q 9/00* | (2006.01) | |

(52) U.S. Cl.
CPC .............. *B60K 28/12* (2013.01); *B60K 15/05* (2013.01); *B60K 23/00* (2013.01); *B60L 50/72* (2019.02); *B60L 58/30* (2019.02); *B60Q 9/00* (2013.01); *H01M 8/04201* (2013.01); *H01M 2250/20* (2013.01)

(58) Field of Classification Search
CPC ... H01M 2250/20; B60K 28/12; B60K 15/05; B60K 23/00; B60K 2015/03019; B60K 2015/03315; B60K 2015/053; B60K 2015/0546; B60L 50/72; B60L 58/30
See application file for complete search history.

(56) References Cited

U.S. PATENT DOCUMENTS

2017/0246965 A1 8/2017 Nakagawa et al.
2017/0297577 A1* 10/2017 Tsuji .................... B60W 10/192

FOREIGN PATENT DOCUMENTS

| JP | 2004178998 A | * | 6/2004 | ........ H01M 8/04335 |
|---|---|---|---|---|
| JP | 2015-042808 | | 3/2015 | |
| JP | 2017-149362 | | 8/2017 | |

OTHER PUBLICATIONS

Yoshinobu et al., JP 2004-178998 A, Espacenet machine translation (Year: 2004).*
Japanese Office Action for Japanese Patent Application No. 2019-053476 dated Feb. 2, 2021.

* cited by examiner

*Primary Examiner* — Adam A Arciero
(74) *Attorney, Agent, or Firm* — Amin, Turocy & Watson, LLP (57) ABSTRACT

A fuel cell vehicle includes a travel prohibition control unit. In the case where a lid sensor detects an open state of a lid, the travel prohibition control unit performs travel prohibition control to prohibit travel of the fuel cell vehicle. In the case where the number of shift control operations has reached a release number within release time, the travel prohibition control unit releases the travel prohibition control, and in the case where the number of shift control operations has not reached the release number within the release time, the travel prohibition control unit continues the travel prohibition control. The release number is two or more.

5 Claims, 7 Drawing Sheets

FUEL CELL VEHICLE

CROSS-REFERENCE TO RELATED APPLICATION

This application is based upon and claims the benefit of priority from Japanese Patent Application No. 2019-053476 filed on Mar. 20, 2019, the contents of which are incorporated herein by reference.

BACKGROUND OF THE INVENTION

Field of the Invention

The present invention relates to a fuel cell vehicle including a lid capable of opening/closing a connector container unit containing a filling connector for filling a fuel gas tank with a fuel gas.

Description of the Related Art

For example, Japanese Laid-Open Patent Publication No. 2017-149362 discloses a fuel cell vehicle which performs travel prohibition control to prohibit travel of a fuel cell vehicle in the case where a lid sensor detects an open state of a lid. Therefore, at the time of filling the fuel gas into the fuel gas tank, in the state where a filling nozzle of a hydrogen gas supply station is connected to a filling connector of a fuel cell vehicle, travel of the fuel cell vehicle (travel of the fuel cell vehicle while the fuel gas is being filled into the fuel gas tank) is prevented. Further, in the fuel cell vehicle, the travel prohibition control is released in the case where shift control operation is performed twice during the travel prohibition control. In this manner, in the case where an open failure occurred in the lid sensor (in the case where the lid sensor erroneously detects that the lid is in the open state even though the lid is in the closed state actually), it becomes possible to enable the fuel cell vehicle to travel.

SUMMARY OF THE INVENTION

In the above conventional technique, after elapse of a relatively long period of time from the time when the first shift control operation was performed during travel prohibition control, in the case where the user performed the second shift control operation erroneously, the travel prohibition control is released. In this case, the travel prohibition control may be released against an intension of a user.

The present invention has been made taking such a problem into account, and an object of the present invention is to provide a fuel cell vehicle in which unintentional release of travel prohibition control is suppressed, and it is possible to enable the fuel cell vehicle to travel in the case where an open failure occurred in a lid sensor.

According to an aspect of the present invention, a fuel cell vehicle is provided. The fuel cell vehicle includes a lid configured to open/close a connector container unit containing a filling connector for filling a fuel gas tank with a fuel gas, a lid sensor configured to detect an open state and a closed state of the lid, a shift control unit configured to change a shift position, a shift control position determination unit configured to determine a shift control position of the shift control unit, a travel prohibition control unit configured to perform travel prohibition control to prohibit travel of the fuel cell vehicle, in a case where the lid sensor detects the open state of the lid, and a shift control operation number determination unit configured to determine whether or not a shift control operation number of the shift control unit has reached a predetermined release number within predetermined release time during the travel prohibition control, wherein the release number is two or more, in a case where the shift control operation number determination unit determines that the shift control operation number has reached the release number within the release time, the travel prohibition control unit releases the travel prohibition control, and in a case where the shift control operation number determination unit determines that the shift control operation number has not reached the release number within the release time, the travel prohibition control unit continues the travel prohibition control.

In the present invention, if the shift control operation number has not reached the release number (two or more) within the release time, the travel prohibition control is continued (the travel prohibition control is not released). Therefore, for example, even if, after elapse of the release time from time the user performed the first shift control operation during the travel prohibition control, the user performs shift control operation for the second time erroneously, the travel prohibition control is not released. Therefore, it is possible to prevent unintentional release of the travel prohibition control. Further, in the case where the shift control operation number reached the release number within the release time during the travel prohibition control, the travel prohibition control is released. Therefore, in the case where the open failure occurred in the lid sensor, the travel prohibition control is released to enable the fuel cell vehicle to travel.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell vehicle according to the present invention will be described with reference to the accompanying drawings.

Figure 1:
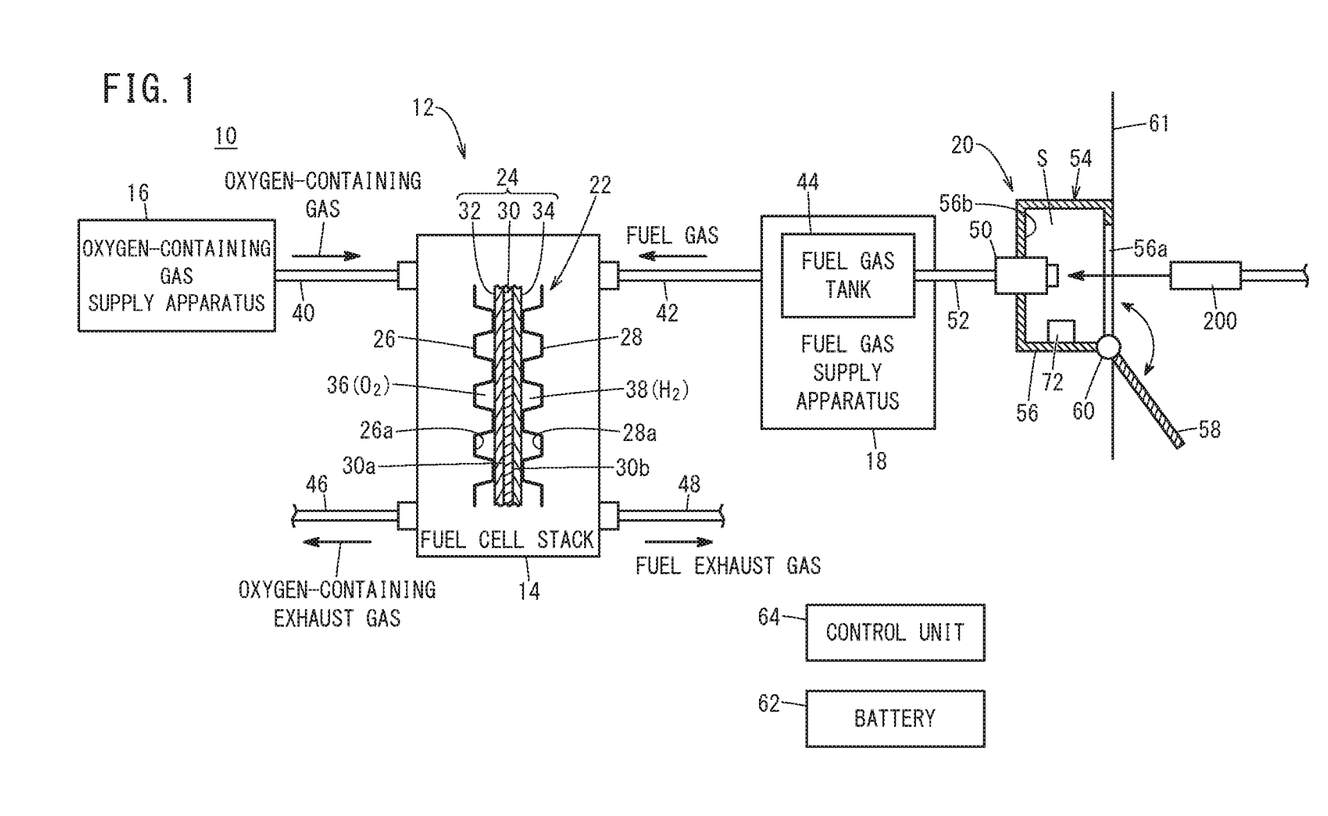
FIG. 1 is a diagram with partial omission schematically showing a fuel cell vehicle according to an embodiment of the present invention.

As shown in FIG. 1, for example, a fuel cell vehicle 10 according to an embodiment of the present invention is a fuel cell electric automobile. A fuel cell system 12 is mounted in the fuel cell vehicle 10.

The fuel cell system 12 includes a fuel cell stack 14, an oxygen-containing gas supply apparatus 16, a fuel gas supply apparatus 18, and a fuel gas filling apparatus 20. The fuel cell stack 14 is formed by stacking a plurality of power generation cells 22 in a horizontal direction or in the gravity direction.

The power generation cell 22 is formed by sandwiching a membrane electrode assembly 24 between a pair of separators 26, 28. The membrane electrode assembly 24 includes a solid polymer electrolyte membrane 30, a cathode 32 provided on one surface 30a of the solid polymer electrolyte membrane 30, and an anode 34 provided on another surface 30b of the solid polymer electrolyte membrane 30. The separator 26 has an oxygen-containing gas flow field 36 on its surface 26a facing the cathode 32. The oxygen-containing gas (e.g., the air) flows through the oxygen-containing gas flow field 36. The separator 28 has a fuel gas flow field 38 on its surface 28a facing the anode 34. The fuel gas (e.g., hydrogen gas) flows through the fuel gas flow field 38. The oxygen-containing gas is supplied to the cathode 32. The fuel gas is supplied to the anode 34. The power generation cell 22 performs power generation partially consuming the oxygen-containing gas supplied to the cathode 32 and the fuel gas supplied to the anode 34.

The oxygen-containing gas supply apparatus 16 supplies the oxygen-containing gas to the fuel cell stack 14 through an oxygen-containing gas supply channel 40. The oxygen-containing gas supply apparatus 16 includes an air pump (not shown) for compressing the air (atmospheric air), and supplying the compressed air.

The fuel gas supply apparatus 18 supplies the fuel gas to the fuel cell stack 14 through a fuel gas supply channel 42. The fuel gas supply apparatus 18 includes a fuel gas tank 44 (hydrogen gas storage container) for storing the fuel gas at high pressure. One fuel gas tank 44, or a plurality of the fuel gas tanks 44 are provided. Though not shown, the fuel gas supply apparatus 18 includes an injector, an ejector, etc.

An oxygen-containing gas discharge channel 46 and a fuel gas discharge channel 48 are connected to the fuel cell stack 14. The oxygen-containing gas (oxygen-containing exhaust gas) partially consumed in power generation is discharged into the oxygen-containing gas discharge channel 46. The fuel gas (fuel exhaust gas) partially consumed in power generation is discharged into the fuel gas discharge channel 48. Further, a coolant supply apparatus (not shown) is provided for the fuel cell stack 14 for circulating a coolant (e.g., pure water, ethylene glycol, oil, etc.) in the fuel cell stack 14.

A fuel gas filling apparatus 20 is used for filling the fuel gas tank 44 with the fuel gas from the outside of the fuel cell vehicle 10. The fuel gas filling apparatus 20 includes a filling connector 50, a fuel gas intake channel 52, and a connector container 54.

The filling connector 50 is connectable to a filling nozzle 200 (filling plug) provided in a fuel gas supply station (hydrogen gas supply station) etc. The fuel gas intake channel 52 connects the filling connector 50 and the fuel gas tank 44 together. The fuel gas intake channel 52 guides the fuel gas supplied from the filling nozzle 200 to the filling connector 50 into the fuel gas tank 44.

The connector container 54 includes a container box 56, a lid 58, and an open/close driver 60. The container box 56 has container space S depressed from an outer surface 61 (e.g., vehicle body outer surface) of the fuel cell vehicle 10 toward the inside of the vehicle body. An opening 56a connecting the container space S and space outside of the fuel cell vehicle 10 is formed in the container box 56. The filling connector 50 is fixed to a bottom surface 56b forming the container space S. The filling connector 50 protrudes toward the opening 56a.

The lid 58 is provided for the container box 56 in a manner that the lid 58 can open/close the container box 56. When the lid 58 is in the closed state, the lid 58 closes the opening 56a. When the lid 58 is in the open state, the lid 58 opens the opening 56a. That is, when the lid 58 is in the closed state, the lid 58 covers the filling connector 50 in a manner that the filling connector 50 is not exposed, and when the lid 58 is in the open state, the lid 58 exposes the filling connector 50 to the outside in a manner that the filling nozzle 200 can be connected to the filling connector 50.

The open/close driver 60 is configured to open/close the lid 58. For example, an electric actuator is uses as the open/close driver 60. It should be noted that the lid 58 is configured in a manner that the lid 58 can be opened/closed manually by a user to enable filling operation of the fuel gas to be performed even if a failure occurs in the open/close driver 60.

The fuel cell system 12 further includes a battery 62 as an energy storage device, and a control unit 64 as a system control device. Electrical energy generated in power generation of the fuel cell stack 14 can be charged in the battery 62. The battery 62 supplies electrical energy required at the time of starting operation. The control unit 64 is configured to be driven by consuming electrical energy supplied from the battery 62. The detailed description of the control unit 64 will be given later.

Figure 2:
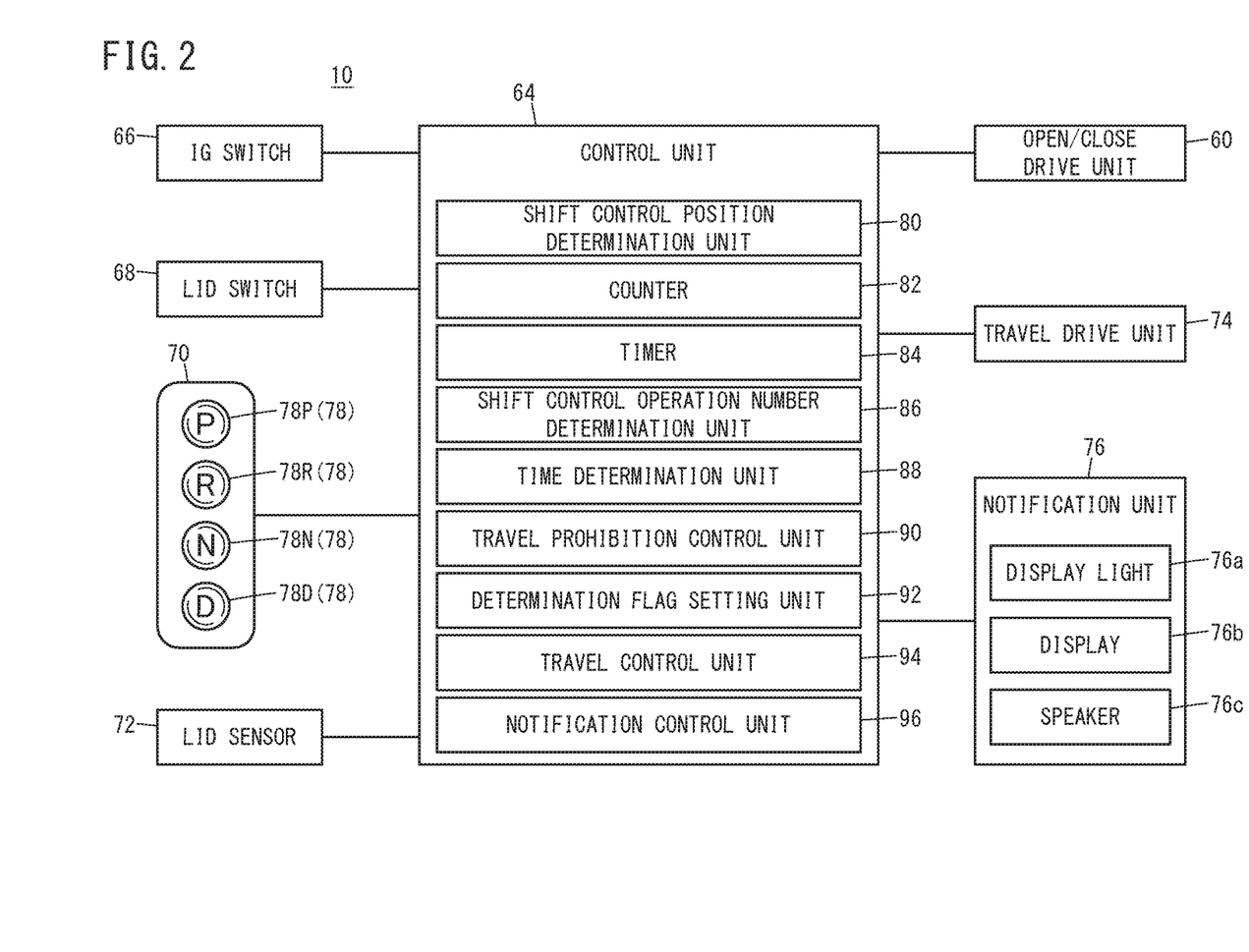
FIG. 2 is a block diagram showing a control unit, etc. of the fuel cell vehicle in FIG. 1.

As shown in FIG. 2, the fuel cell vehicle 10 further includes an IG switch 66 (ignition switch), a lid switch 68, a shift control unit 70, a lid sensor 72, a travel driver unit 74, and a notification unit 76.

The IG switch 66, the lid switch 68, and the shift control unit 70 can be operated by the user. Each of the IG switch 66, the lid switch 68, the shift control unit 70, and the lid sensor 72 is electrically connected to the control unit 64. The IG switch 66 is a switch for starting operation of the fuel cell system 12. The lid switch 68 is a switch for opening/closing the lid 58.

The shift control unit 70 is configure to change a shift position, and includes a plurality of shift buttons 78. In the embodiment of the present invention, the plurality of shift buttons 78 include a parking button 78P, a reverse button 78R, a neutral button 78N, and a drive button 78D. The type of the shift buttons 78 can be selected as necessary. Further, the shift control unit 70 may include a shift lever instead of the shift button 78. In this case, shift control operation of the shift lever can be performed by operating the shift lever to move from a neutral position to a front/rear direction or a left/right position. Preferably, the shift lever is configured to return to the neutral position automatically after the shift control operation. In this case, it is possible to count the number of shift control operations easily.

The lid sensor 72 is provided in the connector container 54 (container box 56) to detect the open state and the closed state of the lid 58 (see FIG. 1). For example, an optical system position sensor or a mechanical position sensor which simply detects the open state and the closed state of the lid 58 can be used as the lid sensor 72. However, the lid sensor 72 may comprise a rotary encoder, etc. for detecting the opening angle of the lid 58.

The travel drive unit 74 is a mechanism for rotating wheels (not shown), and includes a traction motor, a transmission, etc. It should be noted that the travel drive unit 74 may not include the transmission. That is, the travel drive unit 74 may transmit the rotary drive force of the traction motor directly to the wheels (not shown) without using the transmission.

The notification unit 76 notifies alarming information (warning information) to the user. The notification unit 76 includes a display light 76*a* (alarming light), a display 76*b*, and a speaker 76*c*. For example, the display light 76*a* is provided in a meter panel (not shown). The display 76*b* and the speaker 76*c* may be parts of a navigation apparatus. The notification unit 76 may include only one of the display light 76*a*, the display 76*b*, and the speaker 76*c*.

The control unit 64 is a computation unit including a microcomputer. The control unit 64 includes a CPU (central processing unit), and memories such as a ROM and a RAM. The CPU reads, and executes programs stored in the ROM to function as a various function realizing unit (function realizing means). The various function realizing unit may comprise a function realizing unit in the form of hardware.

The control unit 64 includes a shift control position determination unit 80, a counter 82, a timer 84, a shift control operation number determination unit 86, a time determination unit 88, a travel prohibition control unit 90, a determination flag setting unit 92, a travel control unit 94, and a notification control unit 96.

The shift control position determination unit 80 determines shift control positions (e.g., parking, reverse, neutral, drive, etc.) based on a signal from the shift control unit 70. The counter 82 counts the number of times N of shift control operations (shift control operation number N) based on a signal from the shift control unit 70. The timer 84 measures elapsed time T. The shift control operation number determination unit 86 determines whether or not the shift control operation number N counted by the counter 82 has reached a predetermined release number (of times) Na.

The time determination unit 88 determines whether or not the elapsed time T measured by the timer 84 has reached the predetermined release time Ta. The travel prohibition control unit 90 performs, and releases travel prohibition control for prohibiting travel of the fuel cell vehicle 10. Specifically, the travel prohibition control unit 90 performs travel prohibition control by setting the shift position to parking regardless of the shift control position of the shift control unit 70 determined by the shift control position determination unit 80. In the case where the travel prohibition control is not performed, the travel prohibition control unit 90 sets the shift position to the shift control position determined by the shift control position determination unit 80. The determination flag setting unit 92 sets a determination flag for determining release of the travel prohibition control.

The travel control unit 94 controls operation of the travel drive unit 74 based on the shift position (parking) set by the travel prohibition control unit 90. The notification control unit 96 notifies the predetermined alarming information to the notification unit 76.

Next, operation of the fuel cell vehicle 10 having the above structure will be described. Hereinafter, a case where an opening failure has occurred in the lid sensor 72 at the time of filling the fuel gas into the fuel gas tank 44 (a failure where the lid sensor 72 erroneously detects that the lid 58 is in the open state even if the lid 58 is in the closed state actually) will be described.

The user stops the fuel cell vehicle 10 at a fuel gas station, at the time of filling the fuel gas into the fuel gas tank 44. Then, in step S1 in FIG. 3, the user positions the shift control unit 70 at parking (time t1 in FIG. 6 and time t11 in FIG. 7).

Figure 6:
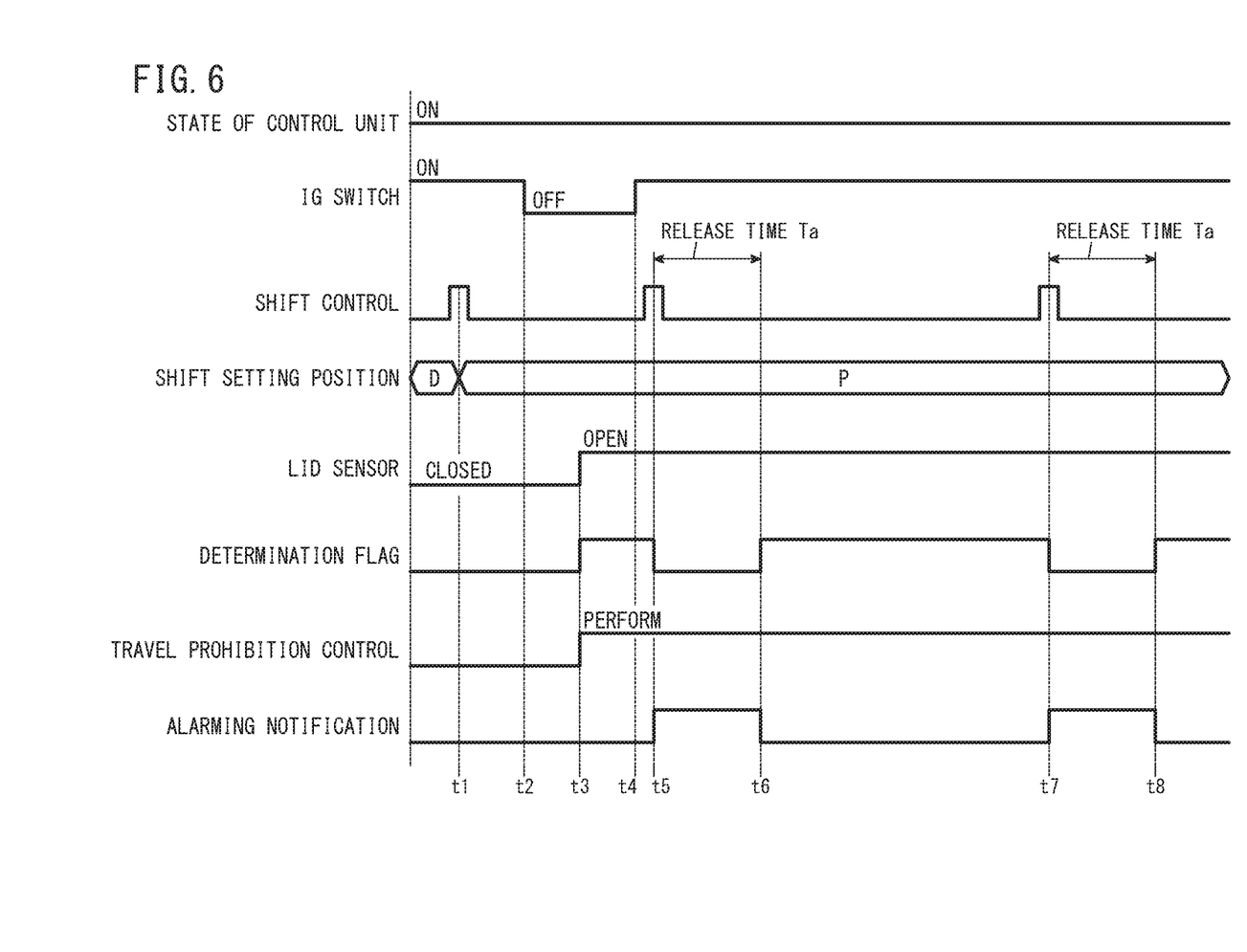
FIG. 6 is a first timing chart illustrating operation of the fuel cell vehicle in FIG. 1.
Figure 7:
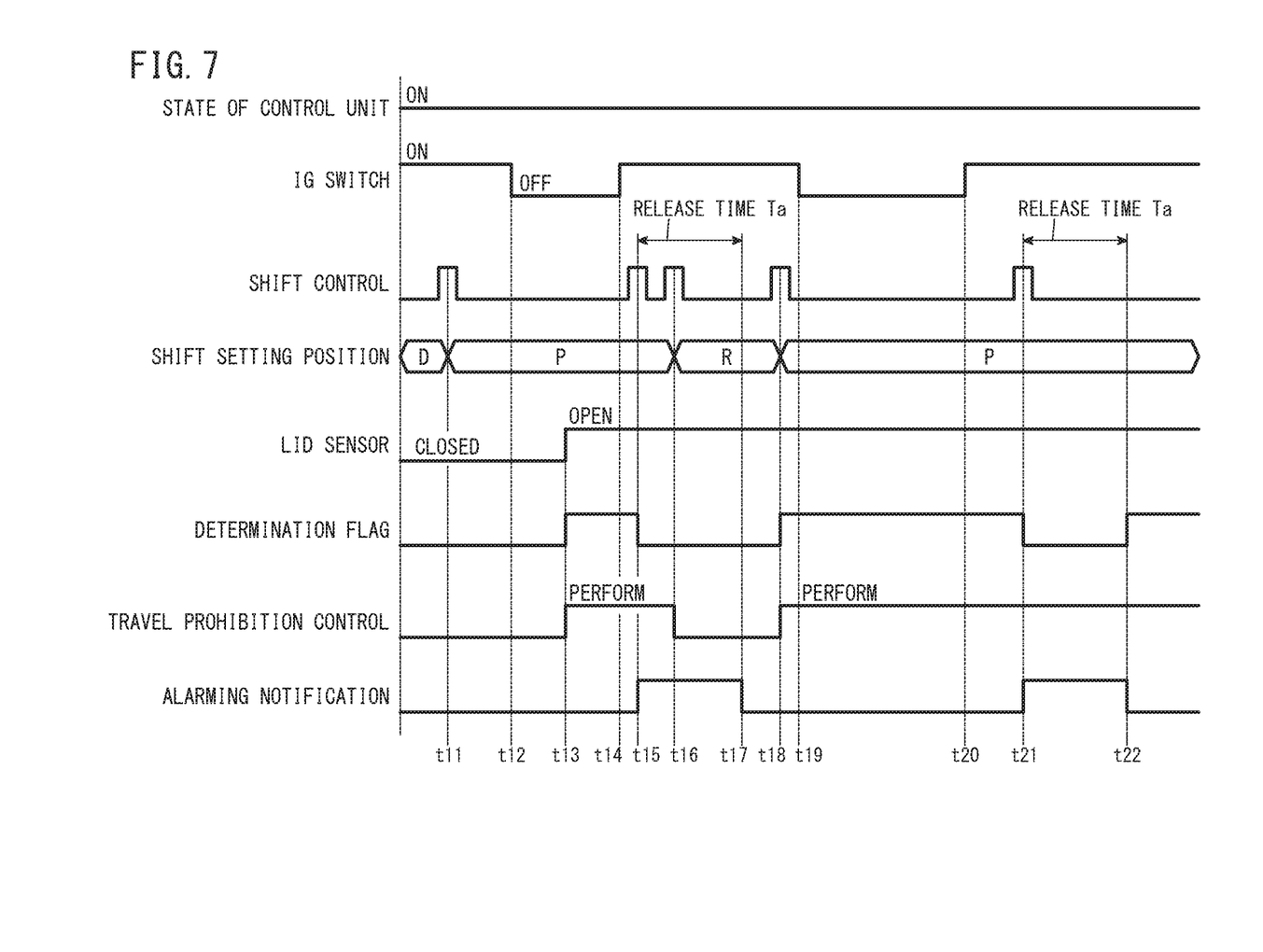
FIG. 7 is a second timing chart illustrating operation of the fuel cell vehicle in FIG. 1.

Then, in step S2, the user turns off the IG switch 66 (time t2 in FIG. 6 and time t12 in FIG. 7). Then, in step S3, the control unit 64 stops power generation of the fuel cell stack 14. It should be noted that electrical energy is supplied from the battery 62 to the control unit 64. In step S3, power generation may be continued, as the power generation stop process of the fuel cell stack 14. Also in this case, operation of filling the fuel gas into the fuel gas tank 44 can be performed. Then, in step S4, the user opens the lid 58. Specifically, the user performs open operation of the lid switch 68 to open the lid 58. It should be noted that the user may open the lid 58 manually. As a result, the filling connector 50 is exposed to the outside through the opening 56*a* of the container box 56.

Figure 3:
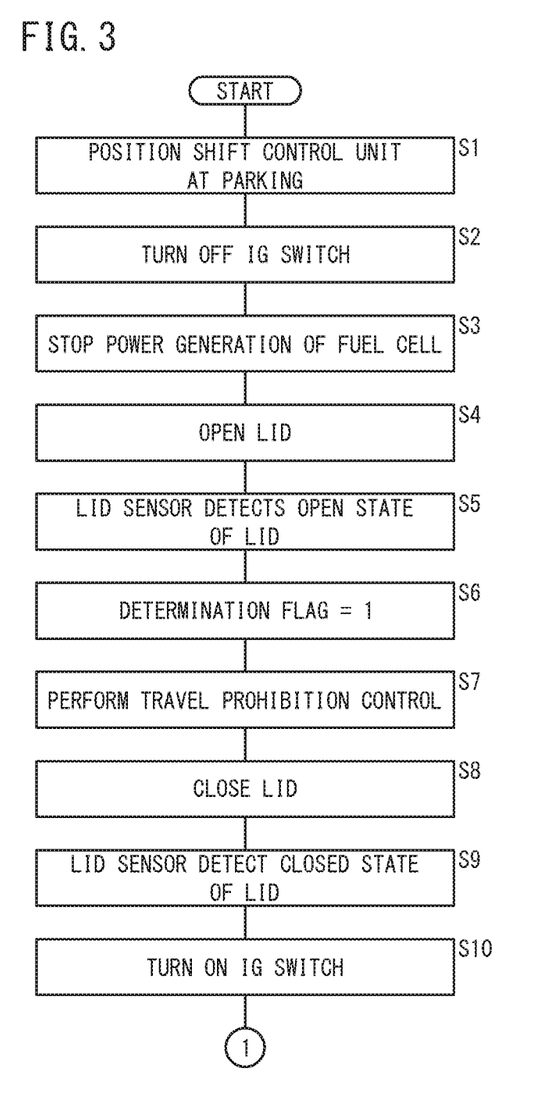
FIG. 3 is a first flow chart illustrating operation of the fuel cell vehicle in FIG. 1.

At this time, as indicated at time t3 in FIG. 6 and at time t13 in FIG. 7, the lid sensor 72 detects the open state of the lid 58 (step S5 in FIG. 3). Further, the determination flag setting unit 92 sets a determination flag to "1" (step S6). Further, the travel prohibition control unit 90 performs travel prohibition control to prohibit travel of the fuel cell vehicle 10 (step S7). Specifically, the travel prohibition control unit 90 fixes the shift position at parking. As a result, the fuel cell vehicle 10 can no longer travel. That is, the fuel cell vehicle 10 cannot travel in the state where the filling nozzle 200 is connected to the filling connector 50 (the fuel cell vehicle 10 cannot travel while the fuel gas is being filled into the fuel gas tank 44).

In this regard, the user may notice that the position where the fuel cell vehicle 10 stopped is deviated from the filling stop position suitable for filling the fuel gas tank (stop position where the filling nozzle 200 is reliably connectable to the filling connector 50). In this case, the user is required to move the fuel cell vehicle 10 to the proper stop position (filling stop position).

Therefore, in step S8 in FIG. 3, the user closes the lid 58. Specifically, the user performs close operation of the lid switch 68 to close the lid 58. However, since an opening failure has occurred in the lid sensor 72, in step S9, the lid sensor 72 detects that the lid 58 is in the open state. Then, in step S10, the user turns on the IG switch 66 (time t4 in FIG. 6 and time t14 in FIG. 7).

Figure 4:
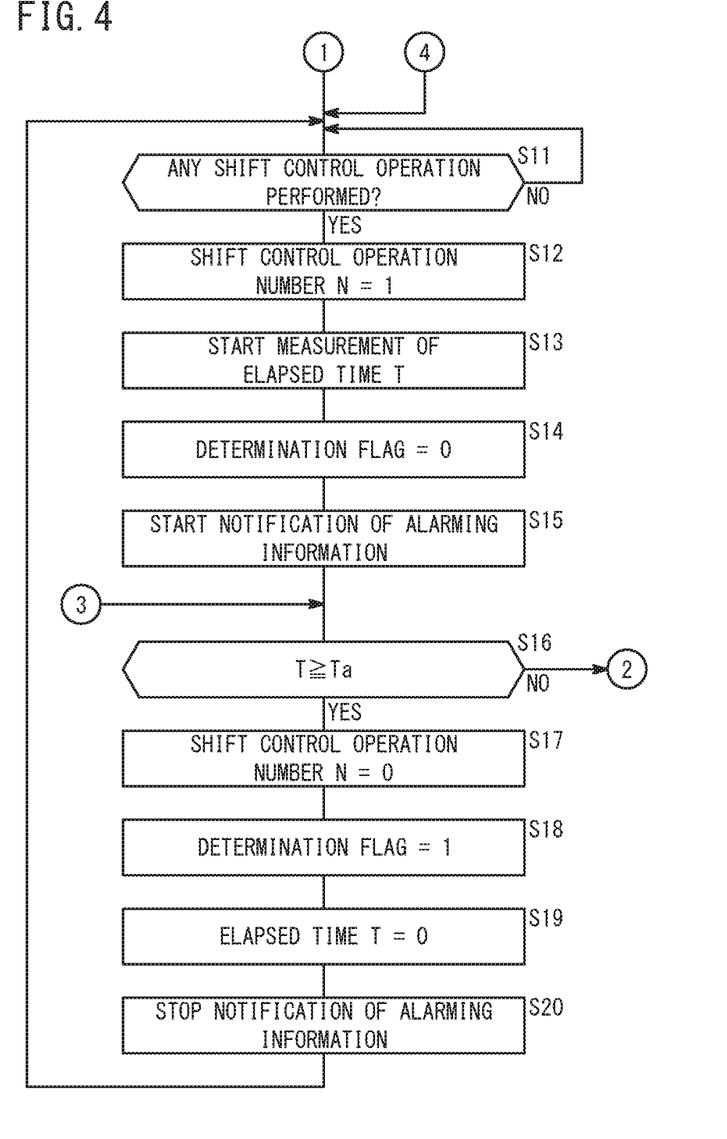
FIG. 4 is a second flow chart illustrating operation of the fuel cell vehicle in FIG. 1.

Then, in step S11 in FIG. 4, the shift control position determination unit 80 determines whether or not any shift control operation of the shift control unit 70 has been performed. Step S11 is performed repeatedly until shift control operation of the shift control unit 70 is performed (step S11: NO). In the case where the shift control position determination unit 80 determines that any shift control operation of the shift control unit 70 has been performed (step S11: YES, time t5 in FIG. 6 and time t15 in FIG. 7), in step S12, the counter 82 sets the shift control operation number N to 1.

Further, in step S13, the timer 84 starts to measure elapsed time T from the time when the first shift control operation of the shift control unit 70 is counted by the counter 82 during travel prohibition control. Further, in step S14, the determination flag setting unit 92 sets the determination flag to 0 (time t5 in FIG. 6 and time t15 in FIG. 7). At this time, the travel prohibition control unit 90 continues travel prohibition control. That is, the travel prohibition control unit 90 maintains the shift position at parking even if the shift control position of the shift control unit 70 is not parking (e.g., reverse, neutral, or drive). That is, the user cannot enable the fuel cell vehicle 10 to travel.

Further, in step S15, the notification control unit 96 starts notification of the alarming information (time t5 in FIG. 6 and time t15 in FIG. 7). Specifically, for example, the notification control unit 96 turns on the display light 76*a* to display a letter message of an alarm, e.g., "THE LID 58 IS IN THE OPEN STATE") on the display 76*b*, and outputs a voice message of the alarm from the speaker 76*c*. It is a matter of course that the message of the alarm can be changed as necessary. That is, in step S15, for example, the notification control unit 96 may perform one of display operation of displaying the alarming message on the display 76*b* and the voice output operation of outputting the alarming message from the speaker 76*c*.

Then, in step S16, the time determination unit 88 determines whether or not the elapsed time T has reached the predetermined release time Ta. The release time Ta is stored in a memory of the control unit 64. The length of the release time Ta can be determined as necessary.

In the case where the time determination unit 88 determines that the elapsed time T has reached the release time Ta (step S16: YES), in step S17, the counter 82 resets the shift control operation number N to 0. Further, in step S18, the determination flag setting unit 92 sets the determination flag to 1 (time t6 in FIG. 6). Further, in step S19, the timer 84 resets the elapsed time T to 0. Moreover, in step S20, the notification control unit 96 stops notification of the alarming information. After the process in step S20, the routine returns to step S11.

That is, after the process in step S20, at time t7 in FIG. 6, in the case where the shift control operation is performed by the user (step S11 in FIG. 4: YES), the counter 82 sets the shift control operation number N to 1 (step S12 in FIG. 4). In this case, in step S17, the number of counts (count number) of the shift control operation number N of the counter 82 has been reset to 0 (history of previous shift control operations of the counter 82 has been deleted). Therefore, even if the present shift control operation is the N-th operation (N>1), the present shift control operation is regarded as the first shift control operation, and the counter 82 sets the shift control operation number N to 1 (step S12).

Further, the timer 84 starts measurement of the elapsed time T (step S13 in FIG. 4), the determination flag setting unit 92 sets the determination flag to 0 (step S14 in FIG. 4), and the notification control unit 96 starts notification of the alarming information (step S15 in FIG. 4).

Then, at time t8 in FIG. 6, when the elapsed time T reaches the release time Ta (step S16 in FIG. 4: YES), the count number of the shift control operation number N of the counter 82 is reset to 0 again (step S17 in FIG. 4). Further, the determination flag setting unit 92 sets the determination flag to 1 (step S18 in FIG. 4), the timer 84 resets the elapsed time T to 0 (step S19 in FIG. 4), and the notification control unit 96 stops notification of the alarming information (step S20 in FIG. 4).

In step S16 in FIG. 4, in the case where the time determination unit 88 determines that the elapsed time T has not reached the release time Ta (step S16 in FIG. 4: NO), in step S21 in FIG. 5, the shift control position determination unit 80 determines whether or not any shift control operation of the shift control unit 70 has been performed. In the case where the shift control position determination unit 80 determines that no shift control operation of the shift control unit 70 is performed (step S21: NO), the routine returns to step S16 in FIG. 4, and the time determination unit 88 determines whether or not the elapsed time T has reached the release time Ta.

Figure 5:
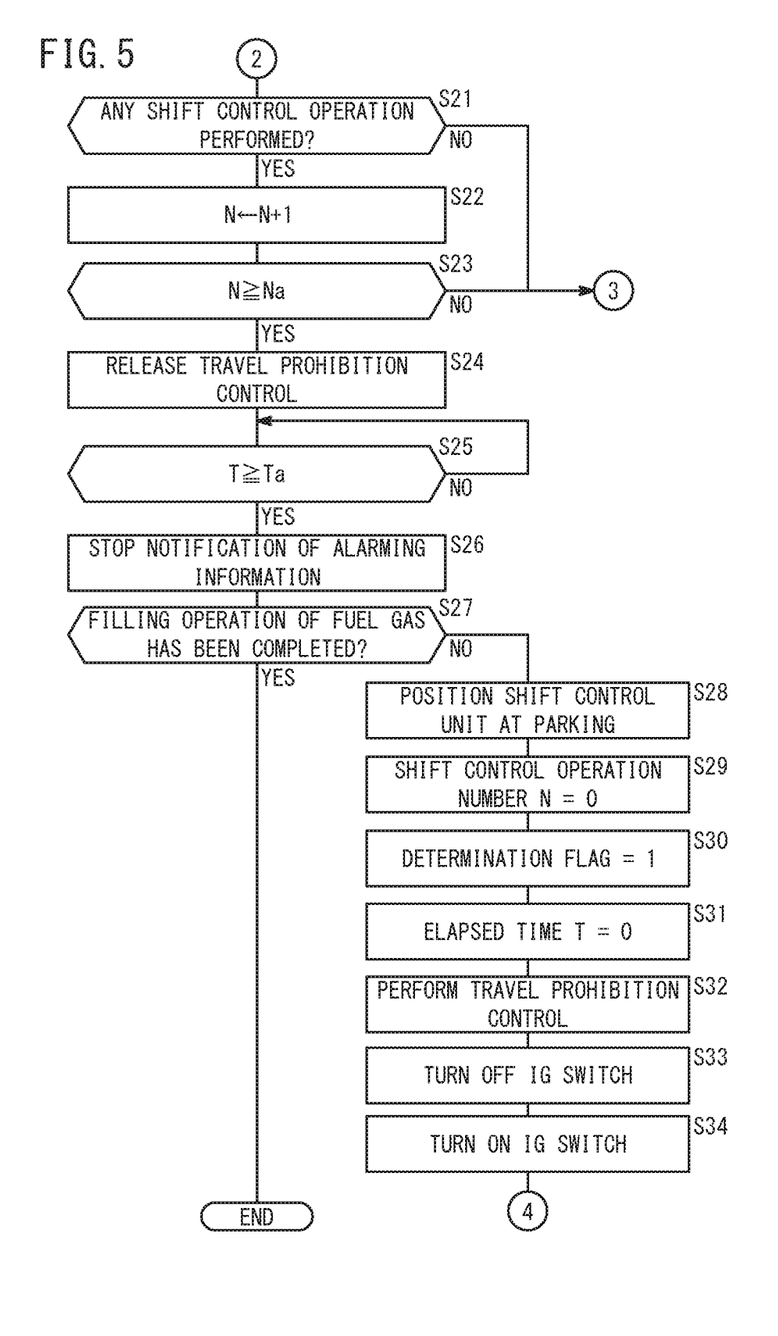
FIG. 5 is a third flow chart illustrating operation of the fuel cell vehicle in FIG. 1.

In the case where the shift control position determination unit 80 determines that any shift control operation of the shift control unit 70 has been performed (step S21 in FIG. 5: YES), in step S22, the counter 82 increments the shift control operation number N by 1. Then, in step S23, the shift control operation number determination unit 86 determines whether or not the shift control operation number N has reached the predetermined release number Na. The release number Na is stored in a memory of the control unit 64. In the embodiment of the present invention, the release number Na is set to two. It should be noted that the release number Na can determined as necessary. The release number Na may be set to three or more.

If the shift control operation number determination unit 86 determines that the shift control operation number N has not reached the release number Na (step S23: NO), the routine returns to step S16 in FIG. 4, and the time determination unit 88 determines whether or not the elapsed time T has reached the release time Ta.

In the case where the shift control operation number determination unit 86 determines that the shift control operation number N has reached the release number Na (step S23 in FIG. 5: YES, time t16 in FIG. 7), in step S24, the travel prohibition control unit 90 releases the travel prohibition control. That is, the travel prohibition control unit 90 releases fixing of the shift position at parking.

Stated otherwise, the travel prohibition control unit 90 sets the shift position to the shift control position of the shift control unit 70. FIG. 7 shows, at time t16, an example where the shift control unit 70 is operated to the position of reverse, and consequently, the travel prohibition control unit 90 sets the shift position to reverse. As a result, even if an opening failure of the lid 58 has occurred, the user can correct the stop position of the fuel cell vehicle 10 to a proper stop position (filling stop position).

It should be noted that, at this time, the notification control unit 96 continues notification of the alarming information (see FIG. 7). Therefore, even if the fuel cell vehicle 10 is movable, the user can recognize that the lid sensor 72 detects that the lid 58 is in the open state.

Further, in step S25 in FIG. 5, the time determination unit 88 determines whether or not the elapsed time T has reached the release time Ta. Step S25 is performed repeatedly until the elapsed time T reaches the release time Ta (step S25: NO). If the time determination unit 88 determines that the elapsed time T has reached the release time Ta (step S25: YES, time t17 in FIG. 7), in step S26, the notification control unit 96 stops notification of the alarming information.

Thereafter, in the case where filling operation of the fuel gas into the fuel gas tank 44 has not been completed (step S27: NO), in step S28, the user positions the shift control unit 70 to parking (time t18 in FIG. 7). At this time, in step S29, the counter 82 resets the shift control operation number N to 0. Further, in step S30, the determination flag setting unit 92 sets the determination flag to 1 (time t18 in FIG. 7). Further, in step S31, the timer 84 resets the elapsed time T to 0. Moreover, in step S32, the travel prohibition control unit 90 performs travel prohibition control (time t18 in FIG. 7).

Thereafter, in step S33, the user turns off the IG switch 66 (time t19 in FIG. 7). As a result, the user can connect the filling nozzle 200 to the filling connector 50, and fill the fuel gas into the fuel gas tank 44. Next, in step S34, the user turns on the IG switch 66 (time t20 in FIG. 7). After the process in step S34, the routine returns to step S11 in FIG. 4.

That is, after the process in step S34, at time t21 in FIG. 7, in the case where any shift control operation has been performed by the user (step S11 in FIG. 4: YES), the counter 82 sets the count number of the shift control operation number N to 1 (step S12 in FIG. 4). In this case, in step S29, the count number of the shift control operation number N of the counter 82 has been reset to 0 (the history of previous shift control operations of the counter 82 has been deleted).

Therefore, even if the present shift control operation is the N-th shift control operation (N>1), the present shift control operation is regarded as the first shift control operation, and the counter 82 sets the shift control operation number N to 1 (step S12).

Further, the timer 84 starts measurement of the elapsed time T (step S13 in FIG. 4), the determination flag setting unit 92 sets the determination flag to 0 (step S14 in FIG. 4), and the notification control unit 96 starts notification of the alarming information (step S15 in FIG. 4).

Then, at time t22 in FIG. 7, when the elapsed time T reaches the release time Ta (step S16 in FIG. 4: YES), the count number of the shift control operation number N counted by the counter 82 is reset to 0 again (step S17 in FIG. 4). Further, the determination flag setting unit 92 sets the determination flag to 1 (step S18 in FIG. 4), the timer 84 resets the elapsed time T to 0 (step S19 in FIG. 4), and the notification control unit 96 stops notification of the alarming information (step S20 in FIG. 4).

In step S27 in FIG. 5, in the case where filling operation of the fuel gas into the fuel gas tank 44 has been completed (step S27: YES), flow of a series of operations is finished.

In the flow of the series of operations as described above, since performance of travel prohibition control does not depend on the ON/OFF state of the IG switch 66 and the power generation state of the fuel cell stack 14, step S2 and step S3 may not be performed.

In this case, the fuel cell vehicle 10 according to the embodiment of the present invention offers the following advantages.

The fuel cell vehicle 10 includes the travel prohibition control unit 90 for performing travel prohibition control to prohibit travel of the fuel cell vehicle 10, in the case where the lid sensor 72 detects the open state of the lid 58, and the shift control operation number determination unit 86 for determining whether or not the shift control operation number N of the shift control unit 70 has reached the predetermined release number Na within the predetermined release time Ta during the travel prohibition control. The release number Na is two or more. In the case where the shift control operation number determination unit 86 determines that the shift control operation number N has reached the release number Na within the release time Ta, the travel prohibition control unit 90 releases travel prohibition control, and in the case where the shift control operation number determination unit 86 determines that the shift control operation number N has not reached the release number Na within the release time Ta, the travel prohibition control unit 90 continues travel prohibition control.

In this system, in the case where the shift control operation number N has not reached the release number Na (two or more) within the release time Ta during travel prohibition control, the travel prohibition control continues (travel prohibition control is not released). Therefore, for example, even in the case where the user performs the second shift control operation erroneously, after elapse of the release time Ta from the first shift control operation during travel prohibition control, the travel prohibition control is not released. Thus, it is possible to prevent unintentional release of the travel prohibition control. Further, in the case where the shift control operation number N reaches the release number Na within the release time Ta during the travel prohibition control, the travel prohibition control is released. Therefore, in the case where an open failure has occurred in the lid sensor 72, the travel prohibition control is released to enable the fuel cell vehicle 10 to travel.

The fuel cell vehicle 10 includes the counter 82 for counting the shift control operation number N during the travel prohibition control. In the case where the shift control operation number determination unit 86 determines that the shift control operation number N has not reached the release time Na within the release time Ta, the counter 82 resets the count value of the shift control operation number N to 0.

In this system, it is possible to count the shift control operation number N for every release time Ta.

After the travel prohibition control is released, in the state where the lid sensor 72 detects the open state of the lid 58, in the case where the shift control unit 70 is positioned at parking, the travel prohibition control unit 90 performs the travel prohibition control again.

In this system, it is possible to more reliably prevent travel of the fuel cell vehicle 10 while the fuel gas is being filled into the fuel gas tank 44.

The fuel cell vehicle 10 includes the notification unit 76 for issuing a notification of the alarming information, in the case where the travel prohibition control is released.

In this system, in the state where the travel prohibition control is released to enable the fuel cell vehicle 10 to travel, it is possible to notify the user that an open failure has occurred in the lid sensor 72.

The travel prohibition control unit 90 performs travel prohibition control by fixing the shift position at parking regardless of the shift control position of the shift control unit 70.

In this system, it is possible to perform the travel prohibition control easily.

The fuel cell vehicle 10 includes the timer 84 for measuring the elapsed time T from the time when the counter 82 counted the first shift control operation during travel prohibition control, and the time determination unit 88 for determining whether or not the elapsed time T measured by the timer 84 has reached the release time Ta.

In this system, it is possible to determine whether or not the travel prohibition control should be released relatively easily.

The above embodiment is summarized as follows:

The above embodiment discloses the fuel cell vehicle (10) including the lid (58) configured to open/close the connector container unit (54) containing the filling connector (50) for filling the fuel gas tank (44) with the fuel gas, the lid sensor (72) configured to detect the open state and the closed state of the lid (58), the shift control unit (70) configured to change the shift position, the shift control position determination unit (80) configured to determine the shift control position of the shift control unit (70), the travel prohibition control unit (90) configured to perform travel prohibition control to prohibit travel of the fuel cell vehicle (10), in the case where the lid sensor (72) detects the open state of the lid (58), and the shift control operation number determination unit (86) configured to determine whether or not the shift control operation number (N) of the shift control unit (70) has reached a predetermined release number (Na) within predetermined release time (Ta) during the travel prohibition control, wherein the release number (Na) is two or more, in the case where the shift control operation number determination unit (86) determines that the shift control operation number (N) has reached the release number (Na) within the release time (Ta), the travel prohibition control unit (90) releases the travel prohibition control, and in the case where the shift control operation number determination unit (86) determines that the shift control operation number (N) has not reached the release number (Na) within the release time (Ta), the travel prohibition control unit (90) continues the travel prohibition control.

The above fuel cell vehicle (10) may include the counter (82) configured to count the shift control operation number (N) during the travel prohibition control, and in the case where the shift control operation number determination unit (86) determines that the shift control operation number (N) has not reached the release number (Na) within the release time (Ta), the counter (82) may rest the count number of the shift control operation number (N) to 0.

In the above fuel cell vehicle (10), after the travel prohibition control is released, in the state where the lid sensor (72) detects the open state of the lid (58), in the case where the shift control unit (70) is positioned at parking, the travel prohibition control unit (90) may perform the travel prohibition control again.

The above fuel cell vehicle (10) may include the notification unit (76) configured to issue a notification of alarming information, in the case where the travel prohibition control is released.

In the above fuel cell vehicle (10), the travel prohibition control unit (90) may be configured to perform the travel prohibition control by fixing the shift position at parking regardless of the shift control position of the shift control unit (70).

The fuel cell vehicle (10) may include the timer (84) configured to measure elapsed time (T) from the time when the counter (82) counted the first operation of the shift control unit (70) during travel prohibition control, and the time determination unit (88) configured to determine whether or not the elapsed time (T) measured by the timer (84) has reached the release time (Ta).

The present invention is not limited to the above described embodiment. Various modifications may be made without departing from the gist of the present invention.

What is claimed is:

1. A fuel cell vehicle comprising:
   a lid configured to open/close a connector container unit containing a filling connector for filling a fuel gas tank with a fuel gas;
   a lid sensor configured to detect an open state and a closed state of the lid;
   a shift control unit configured to change a shift position;
   a shift control position determination unit configured to determine a shift control position of the shift control unit;
   a travel prohibition control unit programmed to perform travel prohibition control to prohibit travel of the fuel cell vehicle, in a case where the lid sensor detects the open state of the lid; and
   a shift control operation number determination unit configured to determine whether or not a shift control operation number of the shift control unit has reached a predetermined release number within predetermined release time during the travel prohibition control,
   wherein the release number is two or more;
   in a case where the shift control operation number determination unit determines that the shift control operation number has reached the release number within the release time, the travel prohibition control unit is programmed to release the travel prohibition control;
   in a case where the shift control operation number determination unit determines that the shift control operation number has not reached the release number within the release time, the travel prohibition control unit is programmed to continue the travel prohibition control,
   in a case of performing the travel prohibition control, the travel prohibition control unit is programmed to fix the shift position at parking, and
   in a case of releasing the travel prohibition control, the travel prohibition control unit is programmed to release the shift position from being fixed at parking and set the shift position to the shift control position of the shift control unit.

2. The fuel cell vehicle according to claim 1, comprising a counter configured to count the shift control operation number during the travel prohibition control,
   wherein, in the case where the shift control operation number determination unit determines that the shift control operation number has not reached the release number within the release time, the counter resets a count number of the shift control operation number to 0.

3. The fuel cell vehicle according to claim 1, wherein, after the travel prohibition control is released, in a state where the lid sensor detects the open state of the lid, in a case where the shift control unit is positioned at parking, the travel prohibition control unit performs the travel prohibition control again.

4. The fuel cell vehicle according to claim 1, comprising a notification unit configured to issue a notification of alarming information, in a case where the travel prohibition control is released.

5. The fuel cell vehicle according to claim 2, comprising:
   a timer configured to measure elapsed time from time when the counter counted a first operation of the shift control unit during travel prohibition control; and
   a time determination unit configured to determine whether or not the elapsed time measured by the timer has reached the release time.

* * * * *